(12) United States Patent
Howell et al.

(10) Patent No.: US 7,983,247 B2
(45) Date of Patent: Jul. 19, 2011

(54) METADATA COLLECTION

(75) Inventors: David A Howell, Seattle, WA (US);
David Milstein, Redmond, WA (US);
Kuansan Wang, Bellevue, WA (US);
Linda Criddle, Kirkland, WA (US);
Michael D Malueg, Renton, WA (US);
Philip A Chou, Bellevue, WA (US);
Scott C Forbes, Redmond, WA (US);
Timothy M Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 11/444,746

(22) Filed: May 31, 2006

(65) Prior Publication Data

US 2007/0280204 A1 Dec. 6, 2007

(51) Int. Cl.
*H04L 12/66* (2006.01)
(52) U.S. Cl. .................................. 370/352; 704/270
(58) Field of Classification Search ................. 370/352; 704/270; 709/223
See application file for complete search history.

(56) References Cited

U.S. PATENT DOCUMENTS

| | | | |
|---|---|---|---|
| 5,884,032 A | 3/1999 | Bateman et al. | 709/204 |
| 6,411,687 B1 | 6/2002 | Bohacek et al. | 379/88.21 |
| 6,442,547 B1 | 8/2002 | Bowman-Amuah | 707/10 |
| 6,625,258 B1 | 9/2003 | Ram et al. | 379/88.13 |
| 6,671,355 B1 | 12/2003 | Spielman et al. | 379/88.12 |
| 6,704,303 B1 | 3/2004 | Bowman-Amuah | 370/352 |
| 7,231,404 B2 | 6/2007 | Paila et al. | 707/104.1 |
| 7,376,129 B2 | 5/2008 | Acharya et al. | 370/352 |
| 7,426,538 B2 | 9/2008 | Bodin et al. | 709/204 |
| 7,443,834 B1 | 10/2008 | Sylvain | 370/352 |
| 7,509,124 B2 | 3/2009 | O'Neil | 455/432.2 |
| 7,724,743 B2 | 5/2010 | Razdan et al. | 370/392 |
| 7,774,790 B1 | 8/2010 | Jirman et al. | 719/318 |
| 2002/0035474 A1* | 3/2002 | Alpdemir | 704/270 |
| 2002/0085696 A1* | 7/2002 | Martin et al. | 379/201.03 |
| 2003/0172175 A1 | 9/2003 | McCormack et al. | 709/232 |

(Continued)

FOREIGN PATENT DOCUMENTS

EP 1 107 549 6/2001

(Continued)

OTHER PUBLICATIONS

U.S. Appl. No. 11/400,612 entitled "Integrated User Interface" filed Apr. 7, 2006.

(Continued)

*Primary Examiner* — Dang T Ton
*Assistant Examiner* — Wei Zhao
(74) *Attorney, Agent, or Firm* — Merchant & Gould

(57) ABSTRACT

A method and system for collecting and communicating contextual information relating to a VoIP conversation is provided. Structured hierarchies are utilized for efficient communications of various amounts and types of contextual information relating to a VoIP conversation. Information identifying at least one structured hierarchy, which will be used to carry the contextual information, is transmitted during establishment of a conversation between two VoIP enhanced devices. The structured hierarchy is selected from a set of predefined and declared structured hierarchies. Subsequently transmitted contextual information exchanged between two VoIP enhanced devices is represented in accordance with the identified structural hierarchy. VoIP clients, network infrastructure, and various service providers can collect the contextual information based on the identified structured hierarchy, update the contextual information by adding, deleting and/or modifying the contextual data. The updated contextual information will be transmitted to other clients, network infrastructure, and service providers.

20 Claims, 13 Drawing Sheets

U.S. PATENT DOCUMENTS

| | | | |
|---|---|---|---|
| 2003/0215078 | A1 | 11/2003 | Brahm et al. ............ 379/211.02 |
| 2004/0141508 | A1 | 7/2004 | Schoeneberger et al. ..... 370/401 |
| 2004/0258216 | A1 | 12/2004 | Reid ......................... 379/88.13 |
| 2005/0039216 | A1 | 2/2005 | Oota ............................. 725/111 |
| 2005/0044197 | A1* | 2/2005 | Lai ............................... 709/223 |
| 2005/0281284 | A1 | 12/2005 | Shim et al. .................... 370/465 |
| 2005/0286711 | A1 | 12/2005 | Lee et al. ................. 379/399.01 |
| 2006/0015580 | A1 | 1/2006 | Gabriel et al. ................ 709/219 |
| 2006/0077956 | A1 | 4/2006 | Saksena et al. ............... 370/352 |
| 2006/0153357 | A1 | 7/2006 | Acharya et al. .......... 379/266.01 |
| 2007/0230443 | A1* | 10/2007 | Milstein et al. ............... 370/352 |
| 2007/0239685 | A1 | 10/2007 | Howell et al. ..................... 707/3 |
| 2007/0265830 | A1 | 11/2007 | Sidhu et al. ........................ 704/9 |
| 2007/0265990 | A1 | 11/2007 | Sidhu et al. ................... 705/418 |
| 2008/0052400 | A1 | 2/2008 | Ekberg ........................... 709/227 |
| 2008/0101339 | A1 | 5/2008 | Forbes et al. ................. 370/352 |

FOREIGN PATENT DOCUMENTS

EP      1 548 997      6/2005

OTHER PUBLICATIONS

AudioTX Communicator, "What is Communicator?" ISDN Codec and Audio over IP Network Software Solution; accessed Jun. 2, 2006 at http://www.audiotx.com/main.html.

Cisco Systems, "IP Phones for all Business Environments," Cisco 7900Series IP Phones—Products and Services—Cisco Systems, access Feb. 2, 2006 at http://www.cisco.com/en/US/products/hw/phones/ps379.index.html.

Office Action dated May 12, 2008, issued in U.S. Appl. No. 11/400,612.

Office Action dated Nov. 25, 2008, issued in U.S. Appl. No. 11/400,612.

Office Action dated Jun. 10, 2009, issued in U.S. Appl. No. 11/400,612.

Office Action dated Jan. 11, 2010, issued in U.S. Appl. No. 11/400,612.

Office Action dated Feb. 2, 2010, issued in U.S. Appl. No. 11/432,163.

Office Action dated Apr. 15, 2010, issued in U.S. Appl. No. 11/431,957.

Office Action dated Jul. 19, 2010, issued in U.S. Appl. No. 11/432,163.

Office Action dated Sep. 27, 2010, issued in U.S. Appl. No. 11/431,957.

Office Action dated Mar. 16, 2011, issued in U.S. Appl. No. 11/431,957.

Office Action dated Feb. 1, 2011, issued in U.S. Appl. No. 11/555,587.

* cited by examiner

METADATA COLLECTION

BACKGROUND

Generally described, an Internet telephony system provides an opportunity for users to have a call connection with enhanced calling features compared to a conventional Public Switched Telephone Network (PSTN)-based telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the digitized voice is converted into small frames of voice data and a voice data packet is assembled by adding an IP header to the frame of voice data that is transmitted and received.

VoIP technology has been favored because of its flexibility and portability of communications, ability to establish and control multimedia communication, and the like. VoIP technology will likely continue to gain favor because of its ability to provide enhanced calling features and advanced services. However, as enhanced calling features and advanced services grow in popularity and complexity, the amount of contextual information to be transmitted in order to provide such features and services becomes excessively large. With regard specifically to enhanced calling features and advanced services, current VoIP approaches can become inefficient for transferring large amounts of contextual information and not flexible in collecting contextual information.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and system for collecting and communicating contextual information relating to a VoIP conversation is provided. Structured hierarchies are utilized for efficient communications of various amounts and types of contextual information relating to a VoIP conversation. Information identifying at least one structured hierarchy, which will be used to carry the contextual information, is transmitted during establishment of a conversation between two VoIP enhanced devices. The structured hierarchy is selected from a set of predefined and declared structured hierarchies. Subsequently transmitted contextual information exchanged between two VoIP enhanced devices is represented in accordance with the identified structured hierarchy. VoIP clients, network infrastructure, and various service providers can collect the contextual information based on the identified structured hierarchy, update the contextual information by adding, deleting and/or modifying the contextual data. The updated contextual information will be transmitted to other clients, network infrastructure, and service providers.

In accordance with an aspect of the present invention, a method for collecting and transmitting contextual information via a conversation channel is provided. A set of contextual information is identified to be included as part of a conversation between two clients. The identified set of contextual information is defined in a hierarchical format. The set of contextual information is transmitted between two clients over the communication channel. In accordance with the method, the hierarchical format corresponds to a set of classes and attributes defining the contextual information. The set of classes includes a call basics class, a call context class, a device type class, and a client class, among others. The set of attributes relating to the call basic class includes call priority, namespace information, call type and the like. The set of attributes relating to the call context class includes subject information, file identification, and keywords relating to the conversation. The set of attributes relating to the device type class includes audio information about a device, video information about a device, and device specific information. Further, the set of attributes relating to the client class includes client biometrics information, client location information, and client rules.

In accordance with another aspect of the present invention, a computer-readable medium having a conversation channel component for initializing and establishing a logical communication channel for a conversation includes an information managing component for identifying a set of contextual information related to the conversation and collecting the identified a set of contextual information. The computer-readable medium also includes a contextual information component for defining a structured hierarchy to include the collected contextual information. The structured hierarchy corresponds to a set of classes and attributes defining the contextual information. Further, the set of classes and attributes of the structured hierarchy correspond to a predefined namespace including call basics class, call contexts class, device type class, and client class.

In accordance with another aspect of the present invention, a system for collecting and transmitting contextual information between a receiving party and a sending party is provided. The collected and transmitted contextual information may relate to a conversation on a communication channel. The system includes the sending party which identifies a set of contextual information related to the conversation, collects the identified contextual information, and transmits the obtained contextual information to the at least one receiving party. The sending party is capable of receiving a set of contextual information from at least one receiving party. The sending party initiates and establishes the communication channel between the sending party and the receiving party. The sending party includes at least one VoIP device associated with a VoIP client and a service provider of the VoIP client.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to a method and system collecting contextual information relating to a conversation over a communication channel. More specifically, the present invention relates to a method and system for providing and utilizing "structured hierarchies" for representing contextual information over a communication channel in a VoIP environment. "Structured hierarchies," as used herein, are predefined organizational structures for arranging contextual information to be exchanged between two or more VoIP devices. For example, structured hierarchies may be XML namespaces. Further, a VoIP conversation includes one or more data streams of information related to a conversation, such as contextual information and voice/multimedia information, exchanged over a conversation channel. Although the present invention will be described with relation to illustrative structured hierarchies and an IP telephony environment with an emphasis on voice communication, one skilled in the relevant art will appreciate that the disclosed embodiments are illustrative in nature and should not be construed as limiting.

Figure 1:
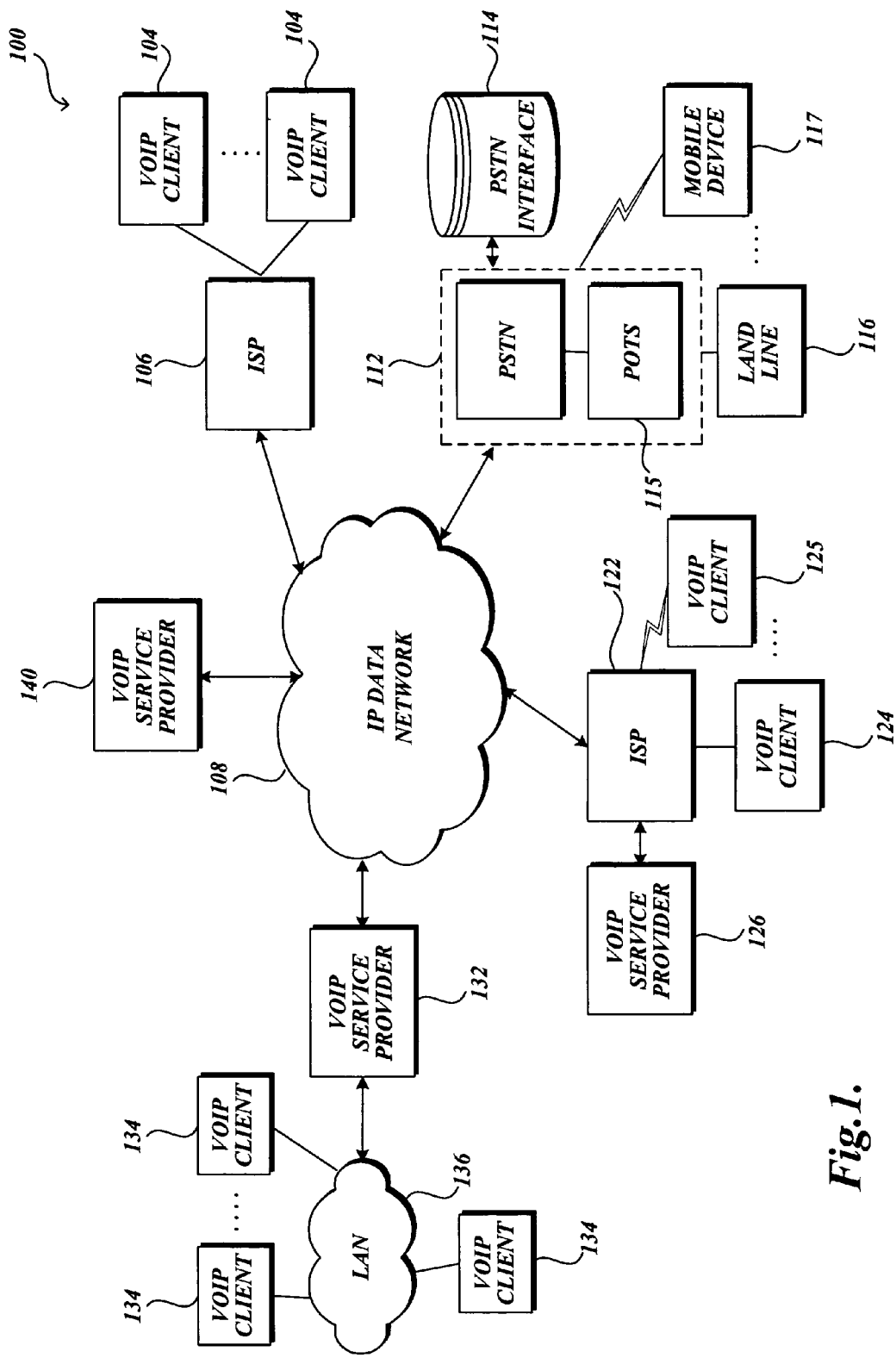
FIG. 1 is a block diagram illustrative of a VoIP environment for providing establishing a conversation channel between various clients in accordance with an aspect of the present invention.

With reference to FIG. 1, a block diagram of an IP telephony environment 100 for providing IP telephone services between various "VoIP clients" is shown. A "VoIP client," as used herein, refers to a particular contact point, such as an individual, an organization, a company, etc., one or more associated VoIP devices and a unique VoIP client identifier. For example, a single individual, five associated VoIP devices and a unique VoIP client identifier may collectively makeup a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live where each individual is associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN) and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. VoIP clients 104, 124, 125, 136 may create, maintain, and provide information relating to predetermined priorities for incoming calls. In addition, the VoIP service providers 126, 132, 140 may also generate, maintain, and provide a separated set of metadata information (e.g., provider priority list) for individuals communicating in a call conversation.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 via PSTN 112, or Private Branch exchange (PBX) 113. A PSTN interface 114 such as a PSTN gateway may provide access between POTS/PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116 may request a connection with the VoIP client and an appropriate VoIP device associated with the VoIP client will be selected to establish a call connection with the conventional voice devices. In one example, an individual associated with the VoIP client may specify which devices are to be used in connecting a call based on a variety of conditions (e.g., connection based on the calling party, the time of day, etc.).

It is understood that the above mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
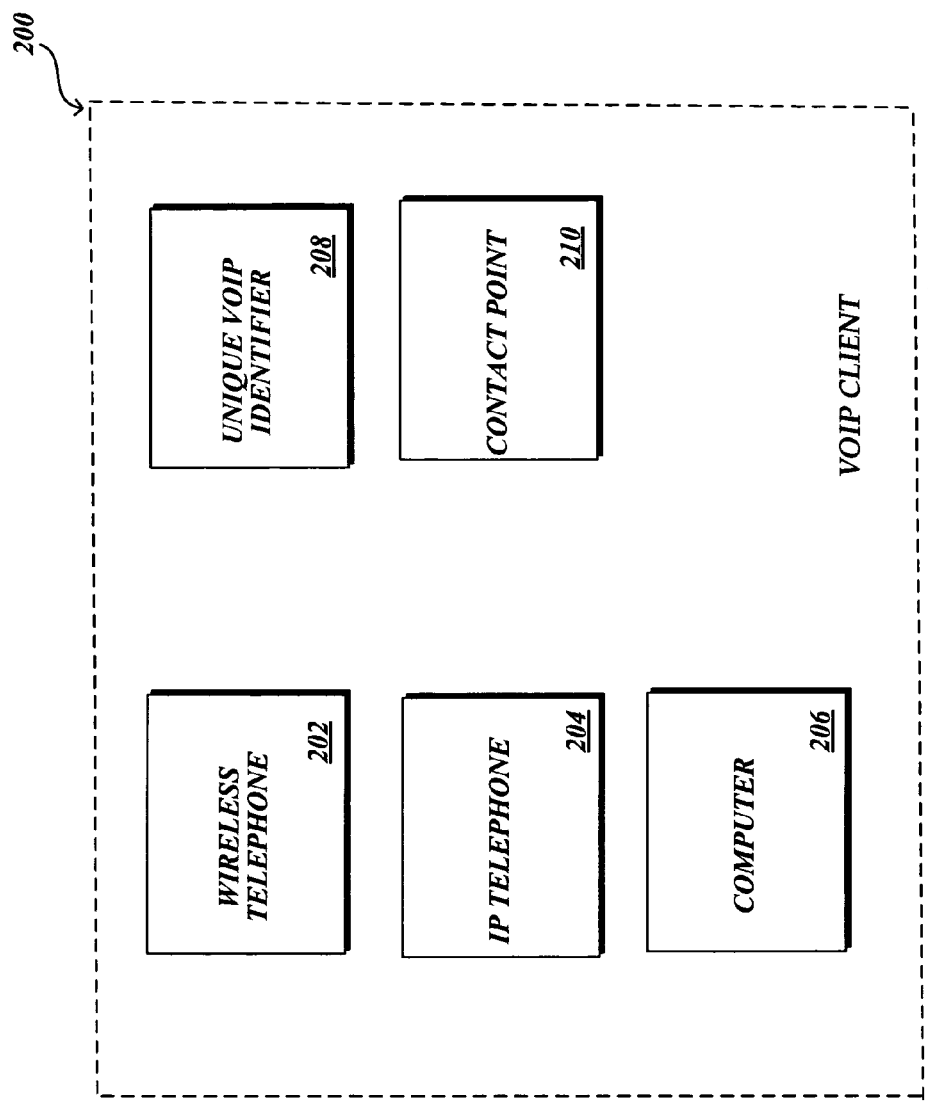
FIG. 2 is a block diagram illustrative of various VoIP devices corresponding to a VoIP client in accordance with an aspect of the present invention.

Referring now to FIG. 2, a block diagram illustrating an exemplary VoIP client 200 that includes several VoIP devices and a unique client identifier, in accordance with an embodiment of the present invention, is shown. Each VoIP device 202, 204, 206 may include a storage that is used to maintain voice messages, address books, client specified rules, priority information related to incoming calls, etc. Alternatively, or in addition thereto, a separate storage, maintained for example by a service provider, may be associated with the VoIP client and accessible by each VoIP device that contains information relating to the VoIP client. In an embodiment, any suitable VoIP device such as a wireless phone 202, an IP phone 204, or a computer 206 with proper VoIP applications may be part of the VoIP client 200. The VoIP client 200 also maintains one or more unique client identifier 208. The unique client identifier(s) 208 may be constant or change over time. For example, the unique identifier(s) 208 may change with each call. The unique client identifier is used to identify the client and to connect with the contact point 210 associated with the VoIP client. The unique client identifier may be maintained on each VoIP device included in the VoIP client and/or maintained by a service provider that includes an association with each VoIP device included in the VoIP client. In the instance in which the unique client identifier is maintained by a service provider, the service provider may include information about each associated VoIP device and knowledge as to which device(s) to connect for incoming communications. In alternative embodiment, the VoIP client 200 may maintain multiple client identifiers. In this embodiment, a unique client identifier may be temporarily assigned to the VoIP client 200 for each call session.

The unique client identifier may be used similar to a telephone number in PSTN. However, instead of dialing a typical telephone number to ring a specific PSTN device, such as a home phone, the unique client identifier is used to reach a contact point, such as an individual or company, which is associated with the VoIP client. Based on the arrangement of the client, the appropriate device(s) will be connected to reach the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
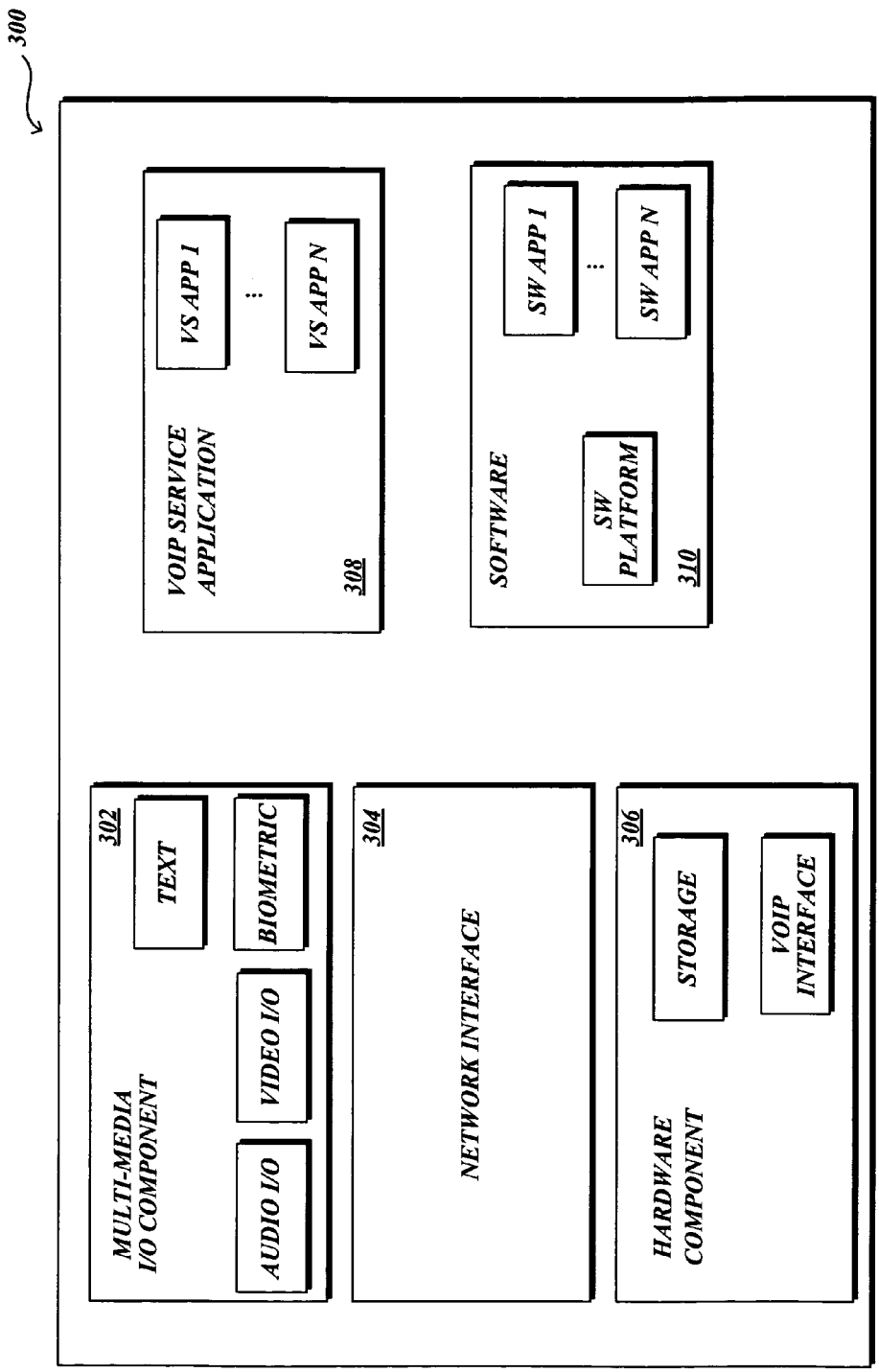
FIG. 3 is a block diagram illustrative of various components associated with a VoIP client device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc. The multimedia input/output component 302 may include any suitable user input/output components such as a microphone, a video camera, a display screen, a keyboard, user biometric recognition devices and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces), and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles) associated with the VoIP client in which the device is included. In one embodiment, the hardware component 306 may include a VoIP interface card which allows non-VoIP client device to transmit and receive a VoIP conversation.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), video CODEC and other suitable applications for providing VoIP services. The CODEC may use voice profiles to filter and improve incoming audio.

Figure 4:
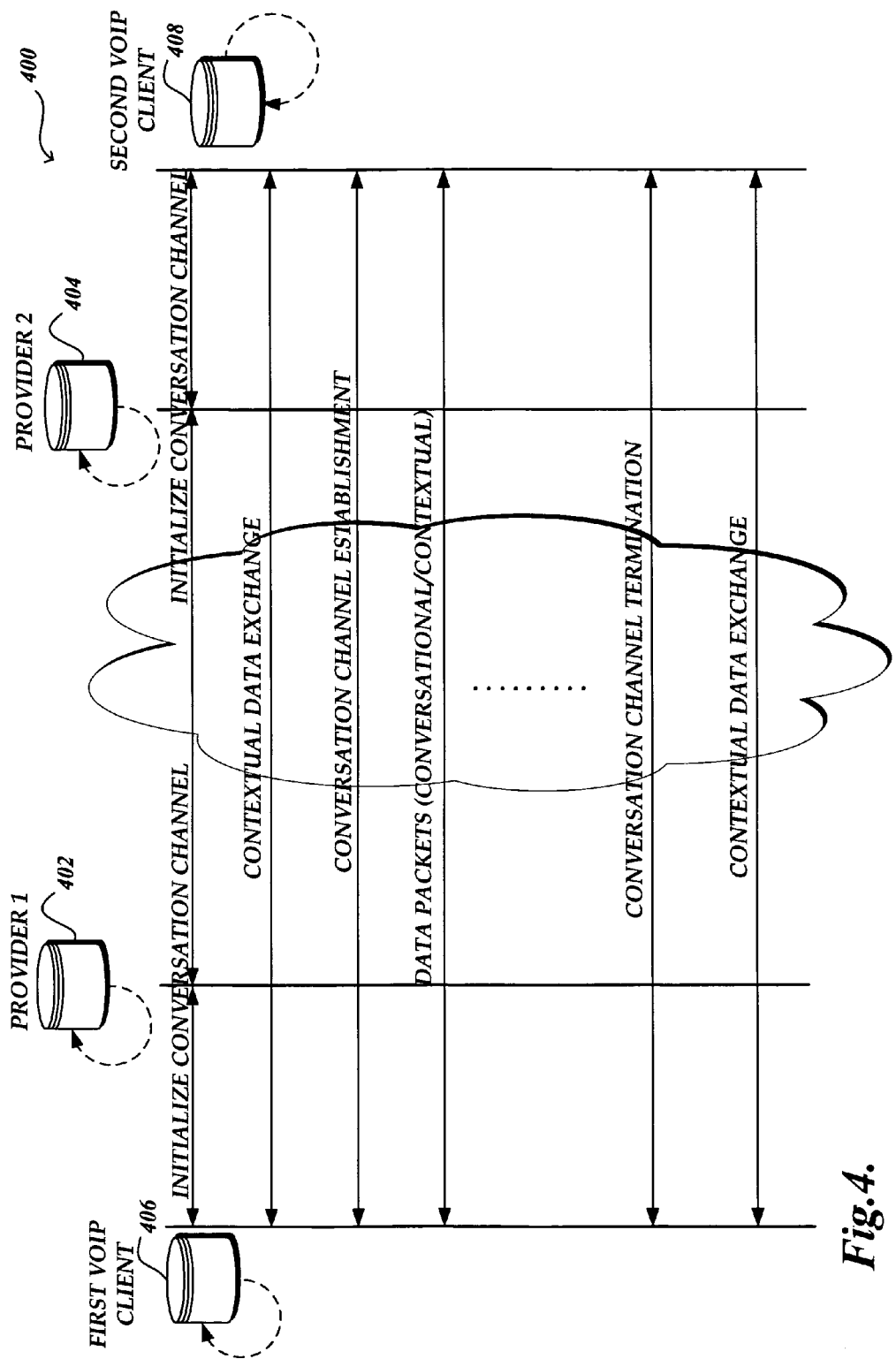
FIG. 4 is block diagrams illustrative of the exchange of data between two VoIP clients over a conversation channel in accordance with an aspect of the present invention.

With reference to FIG. 4, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which both the first VoIP client 406 and the second VoIP client 408 each only includes one VoIP device. Accordingly, the discussion provided herein will refer to connection of the two VoIP devices. The individual using the device of the first VoIP client 406 may select or enter the unique client identifier of the client that is to be called. Provider 1 402 receives the request from the device of the first VoIP client 408 and determines a terminating service provider (e g., Provider 2 404 of the second VoIP client 408) based on the unique client identifier included in the request. The request is then forwarded to Provider 2 404. This call initiation will be forwarded to the device of the second VoIP client. A conversation channel between the device of the first VoIP client 406 and a device of the second VoIP client 408 can then be established.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called. For example, the contextual information sent from the called VoIP client 406 may include priority list of incoming calls from various potential calling VoIP clients including VoIP client 406.

Available media types, rules of the calling client and the client being called, and the like, may also be part of the contextual information that is exchanged during the connection set-up phase. The contextual information may be processed and collected by one the devices of the first VoIP client 406, one of the devices of the second VoIP client 408, and/or by VoIP service providers (e.g., Provider 1 402 and Provider 2 404), depending on the nature of the contextual information. In one embodiment, the VoIP service providers 402, 404 may add/or delete some information to/from the client's contextual information before forwarding the contextual information.

In response to a request to initiate a conversation channel, the second VoIP client 408 may accept the request for establishing a conversation channel or execute other appropriate actions such as rejecting the request via Provider 2 404. The appropriate actions may be determined based on the obtained contextual information. When a conversation channel is established, a device of the first VoIP client 406 and a device of the second VoIP client 408 start communicating with each other by exchanging data packets. As will be described in greater detail, the data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 5:
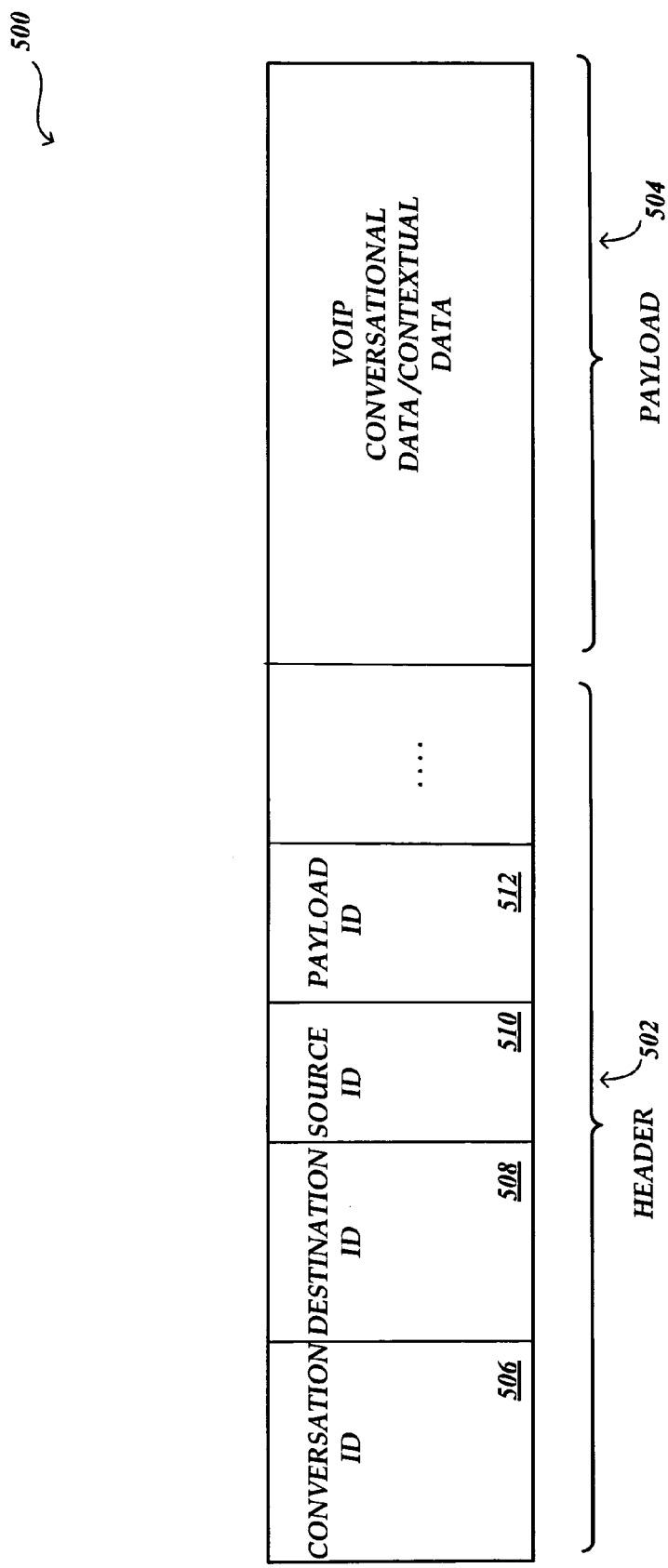
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data. The data packet structure 500 includes a header 502 and a payload 504. The header 502 may contain information necessary to deliver the corresponding data packet to a destination. Additionally, the header 502 may include information utilized in the process of a conversation. Such information may include conversation ID 506 for identifying a conversation (e.g., call), a Destination ID 508, such as a unique client identifier of the client being called, a Source ID 510 (unique client identifier of the calling client or device identifier), Payload ID 512 for identifying type of payload (e.g., conversation or contextual), individual ID (not shown) for identifying the individual for which the conversation data is related, and the like. In an alternative embodiment, the header 502 may contain information regarding Internet protocol versions, and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VCD devices, conversation channel connections (e.g., call basics), conversation context (e.g., call context) and the like. More specifically, the contextual information may include client preference, client rules, client's location (e.g., user location, device location, etc.), biometrics information, the client's confidential information, VoIP device's functionality, VoIP service providers information, media type, media parameters, calling number priority, keywords, information relating to application files, and the like. The contextual information may be processed and collected at each VoIP client and/or the VoIP service providers depending on the nature of the contextual data. In one aspect, the VoIP service providers may add, modify and/or delete VoIP client's contextual data before forwarding the contextual information. For example, client's confidential information will be deleted by the VoIP service provider associated with that client unless the client authorizes such information to be transmitted. In some cases, a minimal amount of contextual information or no contextual information may be exchanged.

Figure 6:
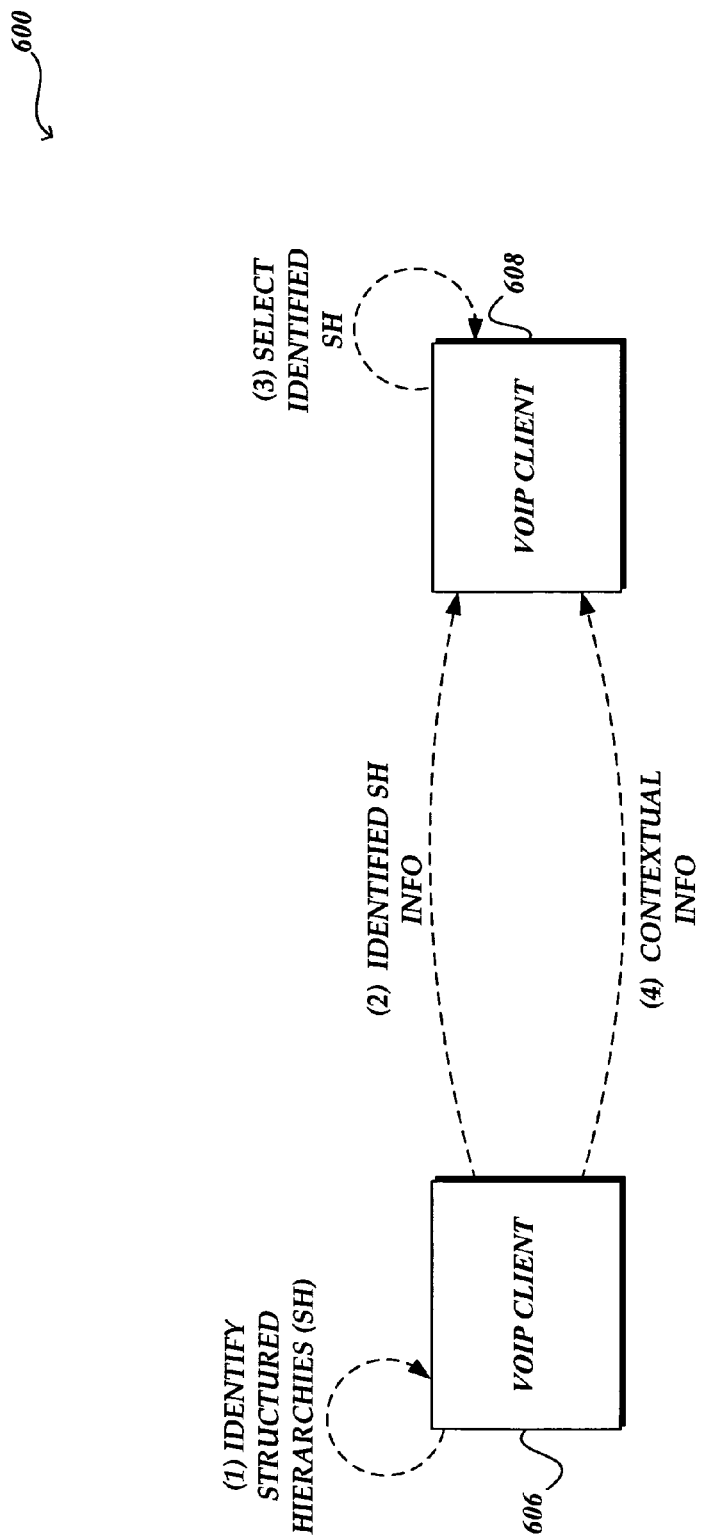
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with FIG. 4, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies are used to carry the contextual information, how to identify the structured hierarchy, and the like. Such information will be exchanged between VoIP Client 606 and VoIP Client 608 before the corresponding contextual information is exchanged. Upon receipt of the information about which structured hierarchy is used to carry the contextual information, VoIP Client 608 looks up predefined structured hierarchies (e.g., XML namespace and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information.

Figure 7:
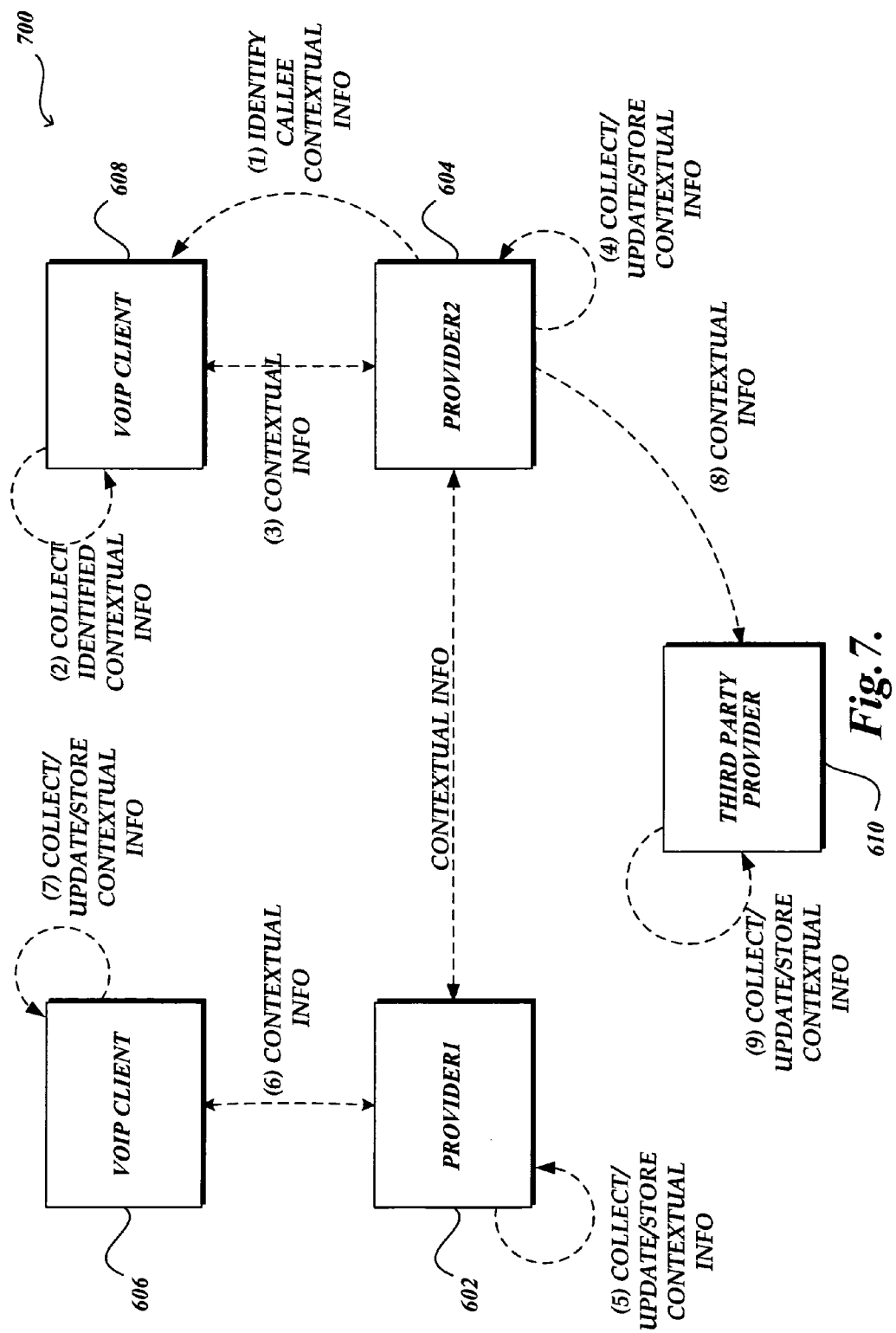
FIG. 7 is a block diagram illustrating interactions among various VoIP entities for collecting and transferring contextual information in accordance with an aspect of the present invention.
Figure 8:
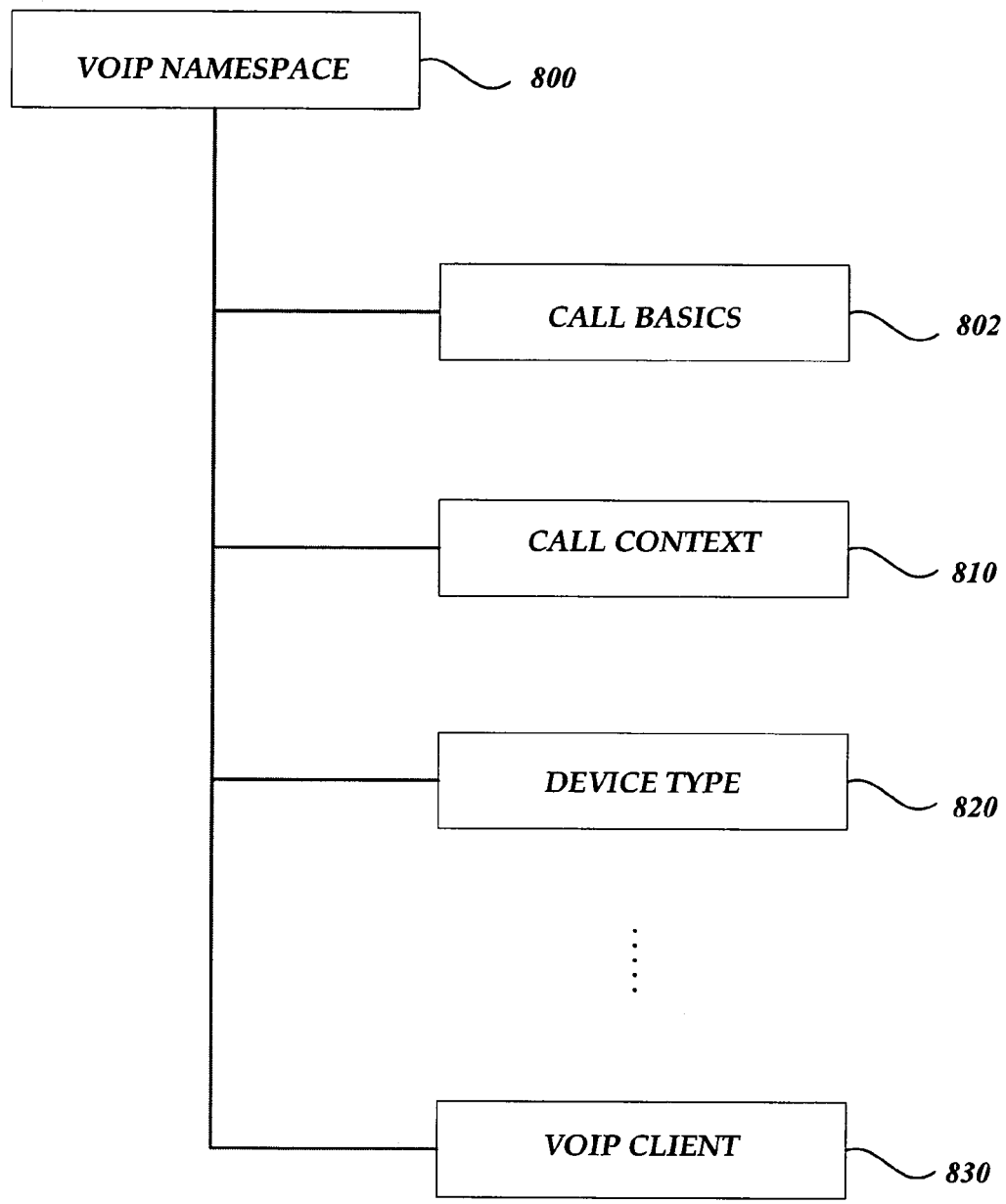
FIGS. 8-12 are block diagrams illustrative of various attributes and classes of structural hierarchies corresponding to VoIP contextual information in accordance with an aspect of the present invention.

With reference to FIG. 7, a block diagram 700 illustrating interactions among several VoIP entities for collecting and transferring contextual information via various service providers, in accordance with an aspect of the present invention. In one embodiment, the contextual information may be exchanged between a sending party and a receiving party. The sending party described herein may be any VoIP entity (e.g. a client, a device, a service provider, a third party service provider, etc.) which can collect and transmit a set of contextual information which is represented based on corresponding structured hierarchies. Likewise, the receiving party described herein may be any VoIP entity which can request for a set of contextual information from the sending party. In this embodiment, a VoIP entity can be either a sending party or receiving party in any given exchange of contextual information.

In an illustrative embodiment, a third party service provider 610 may receive contextual information of VoIP Clients 606, 608 from VoIP service providers 602, 604. For discussion purposes, assume that each client only has one device associated therewith and the connection occurs between those two devices. Additionally, VoIP Client 606 has Provider 1 602 for the VoIP service provider and a third party provider 610 is available for additional VoIP services. While this example utilizes two VoIP service providers and two VoIP clients, any number and combination of VoIP clients and/or service providers may be used with embodiments of the present invention. In one embodiment, devices of VoIP Client 606 and VoIP Client 608 have established a conversation channel via Provider 1 602 and Provider 2 604.

During a VoIP conversation, Provider 2 604 may identify contextual information which will be obtained from VoIP Client 608. VoIP Client 608 collects the identified contextual information and identifies structured hierarchies which will be used to carry the identified contextual information. The collected contextual information is transmitted from VoIP Client 608 to Provider 2 604. Provider 2 604 is the receiving party and VoIP Client 608 is the sending party in this transmission of the contextual information. Provider 2 604 may store all or part of the received contextual information. Further, Provider 2 604 may collect more information, if necessary, and update the received contextual information based on the information. In one embodiment, Provider 2 604 may add service provider information relating to services provided for VoIP Client 608, such as billing information, rates, and the like. Similarly, Provider 2 604 may delete and/or modify contextual data from the received contextual information.

In an illustrative embodiment, the information regarding the identified structured hierarchies is also transmitted to Provider 2 604. The information regarding the identified structured hierarchies may include the information about which structured hierarchies are used to carry the contextual information, how to identify the structured hierarchies, and the like. Provider 2 604 transmits the information regarding the identified structured hierarchies and the contextual information to Provider 1 602. In this example, Provider 2 604 is now the sending party and Provider 1 602 is the receiving party of the contextual information. Provider 1 602 may collect more contextual information, if necessary, and update the received contextual information. Moreover, Provider 1 602 may add, delete, and/or modify a contextual data before forwarding the received contextual information to VoIP Client 606. Provider 1 602 transmits the contextual information to VoIP Client 606. Likewise, VoIP Client 606 may further collect contextual information and transmit the collected contextual information and corresponding structured hierarchies information to VoIP Client 608 via Provider 1 602 and Provider 2 604.

As will be discussed in greater detail below, it is to be understood that a VoIP entity can be both a sending party and a receiving party at the approximate same time. For example, Provider 1 602 may also receive a first set of contextual information from VoIP Client 606 while receiving a second set of contextual information relating to VoIP Client 608 from Provider 2 604. Upon receipt of the contextual information, Provider 1 602 transmits the first set of contextual information to Provider 2 604 while receiving the second set of contextual information from Provider 2 604. Likewise, VoIP Clients 606, 608 can receive contextual information from their service providers while transmitting contextual information to their service providers. As such, it is contemplated that contextual information will be continuously exchanged among VoIP entities (e.g., Provider 1 602, VoIP Client 606, Provider 2 604, VoIP Client 608) before, during, and after a conversation over a two-way communication channel.

In one embodiment, Provider 1 602 sends the information regarding the identified structured hierarchies and the contextual information to VoIP Client 606. As mentioned above, VoIP Client 606 further processes the received contextual information in accordance with the identified structured hierarchies. For example, upon receipt of the information regarding the identified structured hierarchies, VoIP Client 606 looks up predefined structured hierarchies to select the identified structured hierarchies for the contextual information.

In one embodiment, the structured hierarchies may be defined by Extensible Markup Language (XML). However, it is to be appreciated that the structured hierarchies can be defined by any language suitable for implementing and maintaining extensible structured hierarchies. Generally described, XML is well known for a cross-platform, software and hardware independent tool for transmitting information. Further, XML maintains its data as a hierarchically-structured tree of nodes, each node comprising a tag that may contain descriptive attributes. XML is also well known for its ability to follow extendable patterns that may be dictated by the underlying data being described. Typically, a XML namespace is provided to give the namespace a unique name. In some instances, the namespace may be used as a pointer to a centralized location containing default information about the namespace.

In a particular embodiment, VoIP Client 606 may identify a XML namespace for contextual information. For example, the XML namespace attribute may be placed in the start tag of a sending element. It is to be understood that XML namespaces, attributes, and classes illustrated herein are provided merely as an example of structured hierarchies used in conjunction with various embodiments of the present invention. After VoIP Client 608 receives the XML namespace information, the VoIP Client 606 transmits a set of contextual data packets defined in accordance with the identified XML namespace to VoIP Client 608. When a namespace is defined in the start tag of an element, all child elements with the same prefix are associated with the same namespace. As such, VoIP Client 608 and VoIP Client 606 can transmit contextual information without including prefixes in all the child elements, thereby reducing the amount of data packets transmitted for the contextual information.

With reference to FIGS. 8-12, block diagrams illustrative of various classes and attributes of structured hierarchies corresponding to VoIP contextual information are shown. As mentioned above, structured hierarchies are predefined organizational structures for arranging contextual information to be exchanged between two or more VoIP devices. Structured hierarchies can be defined, updated, and/or modified by redefining various classes and attributes. The VoIP contextual information exchanged between various VoIP entities (e.g., clients, service providers, etc.) may correspond to a VoIP namespace 800. In one embodiment, the VoIP namespace 800 is represented as a hierarchically structured tree of nodes, each node corresponding to a subclass which corresponds to a subset of VoIP contextual information. For example, a VoIP Namespace 800 may be defined as a hierarchically structured tree comprising a Call Basics Class 802, a Call Contexts Class 810, a Device Type Class 820, a VoIP Client Class 830 and the like.

Figure 9:
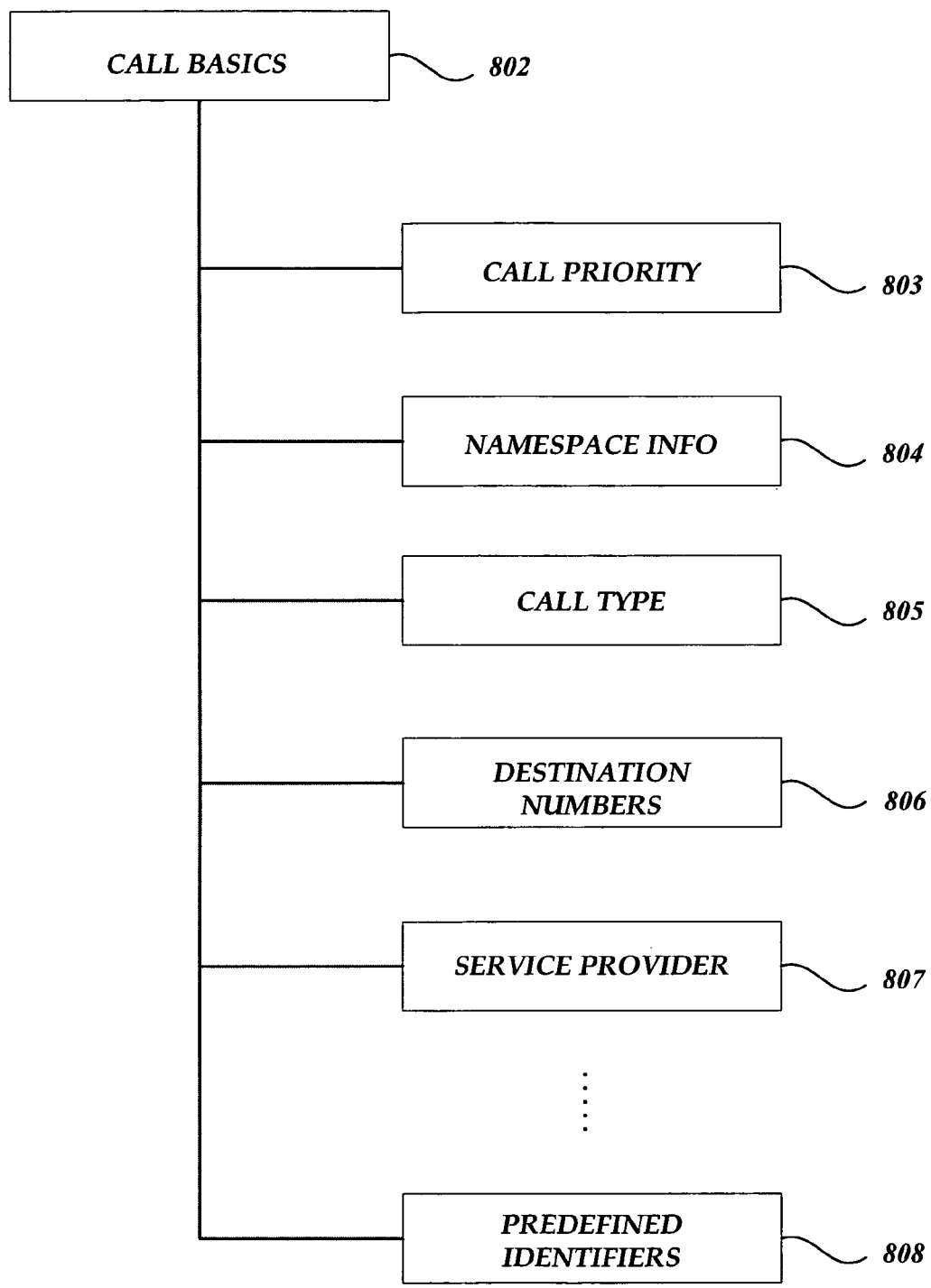

With reference to FIG. 9, a block diagram of a Call Basics Class 802 is shown. In an illustrative embodiment, Call Basics Class 802 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's client ID number), destination numbers (e.g., callees' client ID numbers or telephone numbers), call connection time, VoIP service provider related information, and/or ISP related information such as IP address, MAC address, namespace information, and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, and so forth. In one embodiment, the contextual information relating to a conversation channel connection may include predefined identifiers which represent emotions, sounds (e.g., "ah", "oops", "wow", etc.) and facial expressions in graphical symbols. In one embodiment, a Call Basics Class 802 may be defined as a sub-tree structure of a VoIP Namespace 800, which includes nodes such as call priority 803, namespace information 804, call type 805, destination numbers 806, service provider 807, predefined identifiers 808, and the like.

Figure 10:
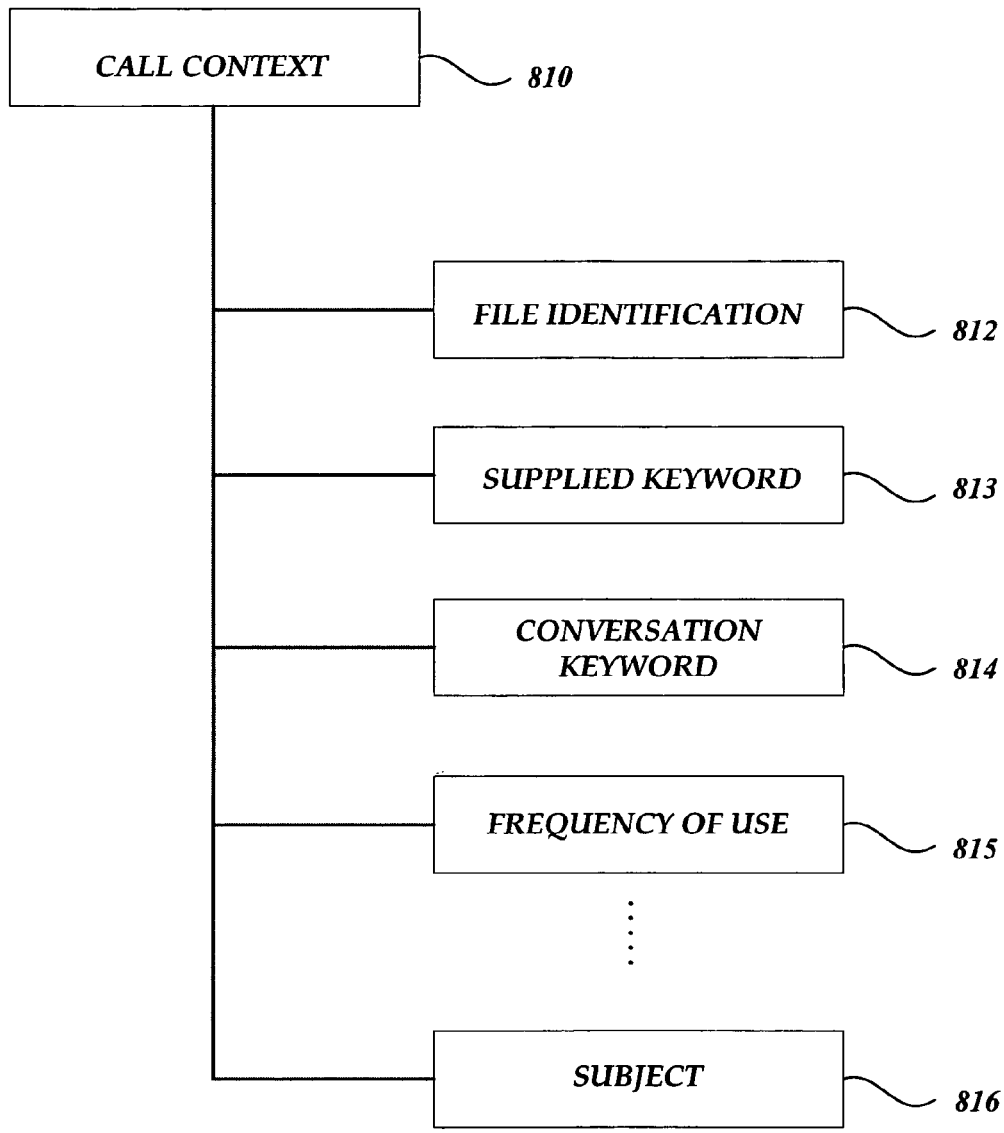

With reference to FIG. 10, a block diagram of a Call Contexts Class 810 is shown. In one embodiment, a subset of VoIP contextual information relating to conversation context may correspond to the Call Contexts Class 810. The contextual information relating to conversation context may include information such as keywords supplied from a client, a service provider, a network, etc. The contextual information relating to conversation context may also include identified keywords from document file data, identified keywords from a conversation data packet (e.g., conversation keywords), file names for documents arid/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation), among many others. In accordance with an illustrative embodiment, a Call Contexts Class 810 may be defined as a sub-tree structure of a VoIP Namespace 800, which includes nodes corresponding to file identification 812, supplied keyword 813, conversation keyword 814, frequency of use 815, subject of the conversation 816, and the like.

Figure 11:
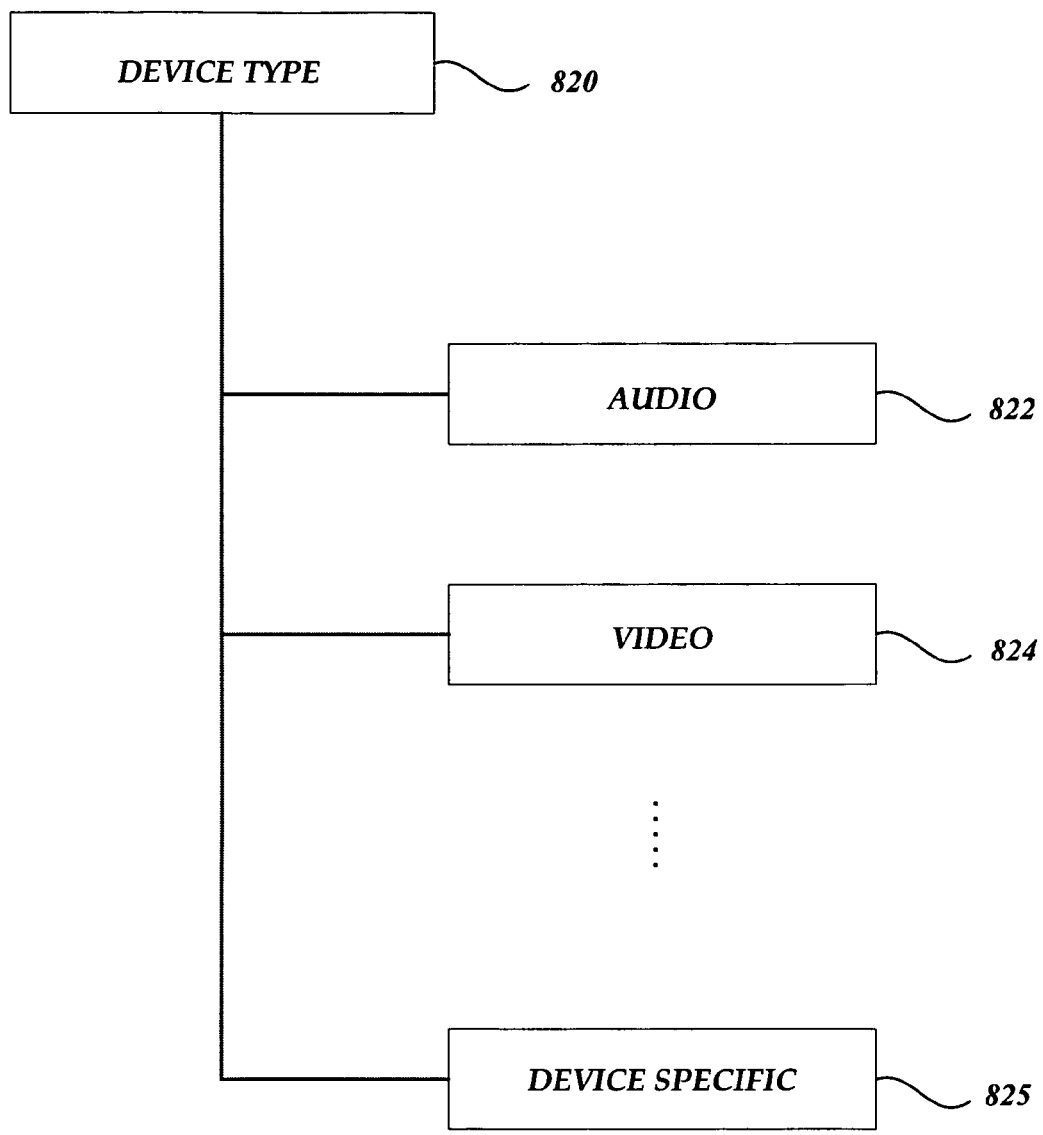

With reference to FIG. 11, a block diagram of a Device Type Class 820 is depicted. In one embodiment, a Device Type Class 820 may correspond to a subset of VoIP contextual information relating to a VoIP client device used for the conversation channel connection. The subset of the VoIP contextual information relating to the VoIP client device may include audio related information which may be needed to process audio data generated by the VoIP client device. The audio related information may include information related to the device's audio functionality and capability, such as sampling rate, machine type, output/input type, microphone, Digital Signal Processing (DSP) card information, and the like. The subset of the VoIP contextual information relating to the VoIP client device may include video related information which may be needed to process video data generated by the VoIP client device. The video related information may include resolution, refresh, type and size of the video data, graphic card information, and the like. The contextual information relating to VoIP client devices may further include other device specific information such as a type of the computer system, processor information, network bandwidth, wireless/wired connection, portability of the computer system, processing settings of the computer system, and the like. In an illustrative embodiment, a Device Type Class 820 may be defined as a sub-tree structure of a VoIP Namespace 800, which includes nodes corresponding to Audio 822, Video 824, Device Specific 826 and the like.

Figure 12:
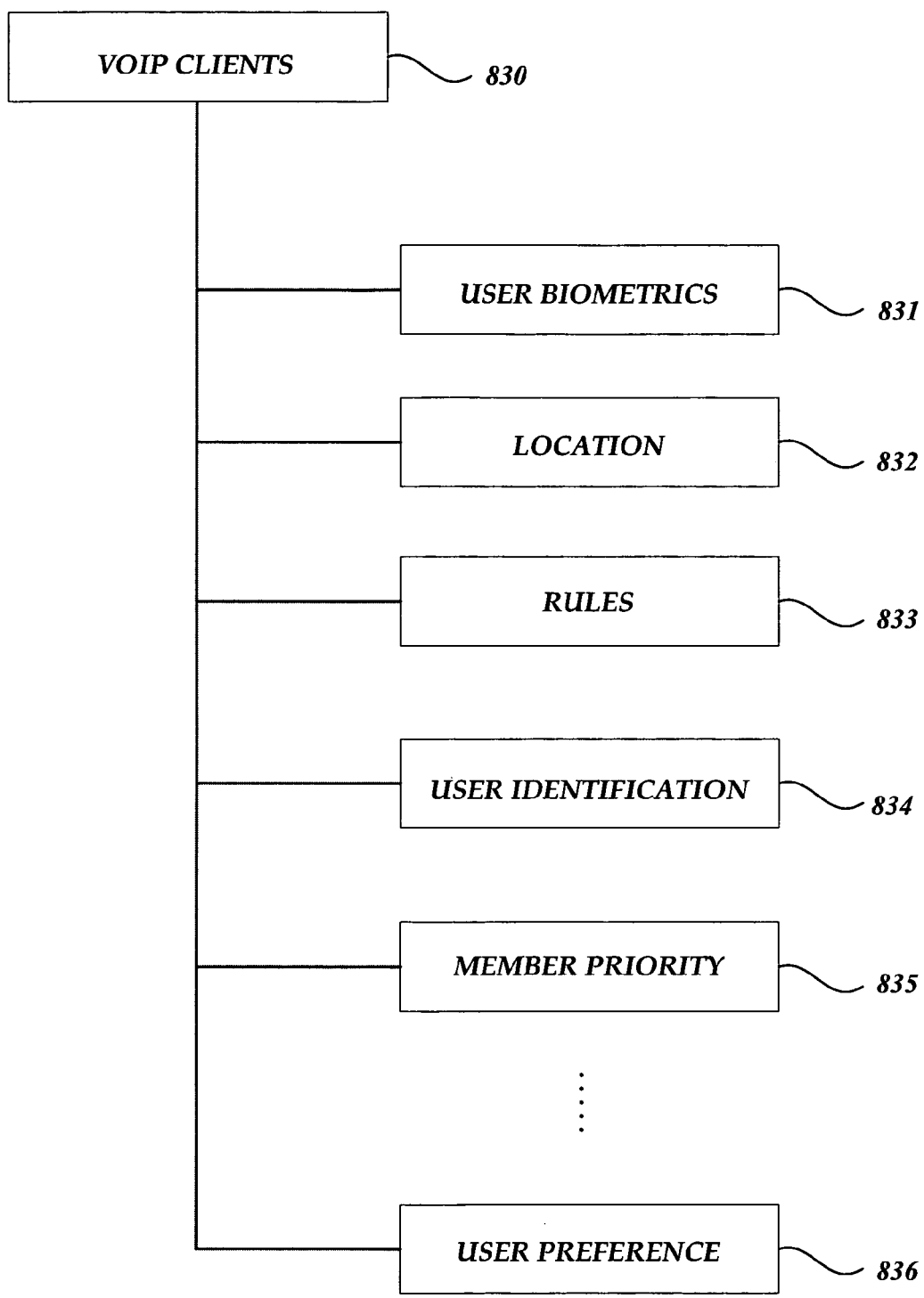

With reference to FIG. 12, a block diagram of a VoIP Client Class 830 is depicted. In accordance with an illustrative embodiment, a VoIP Client Class 830 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. Additionally, the subset of the VoIP contextual information relating to the VoIP client may include location information (including a client defined location, a VoIP defined location, a GPS/triangulation location, and a logical/virtual location of an individual user), assigned phone number, user contact information (such as name, address, company, and the like), rules defined by the client, a service provider, a network, etc., user preferences, digital rights management (DRM), a member rank of an individual user in an organization, priority associated with the member rank, and the like. The priority associated with the member rank may be used to assign priority to the client for a conference call. In one embodiment, a VoIP Client Class 830 may be defined as a sub-tree structure of a VoIP Namespace 800, which includes nodes corresponding to user biometrics 831, location 832, rules 833, user identification 834, member priority 835, client preference 836, and the like.

Figure 13:
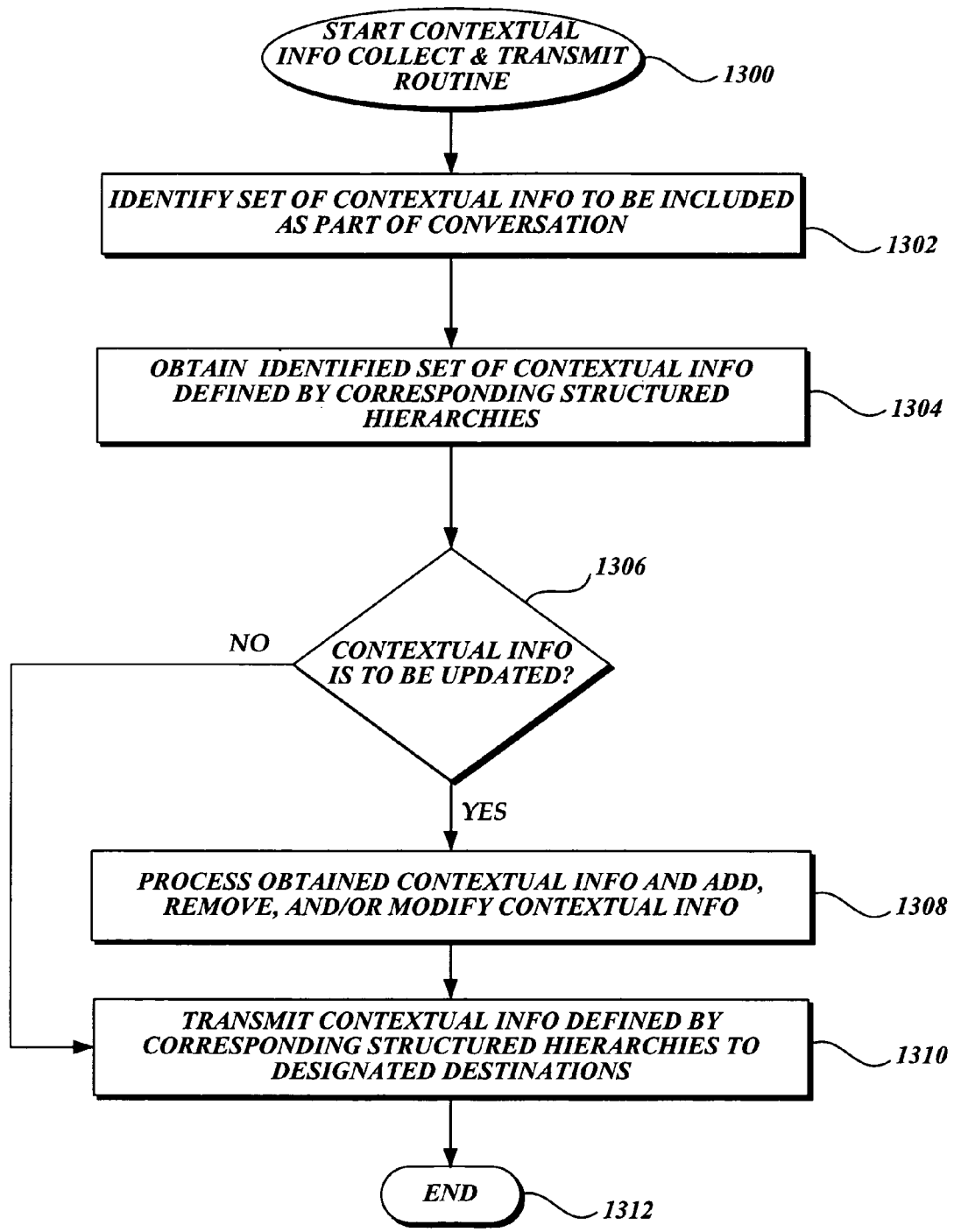
FIG. 13 is a flow diagram of a contextual information collect-and-transmit routine in accordance with an aspect of the present invention.

FIG. 13 is a flowchart of a contextual information collect-and-transmit routine 1300 for collecting and transmitting contextual information in accordance with an embodiment of the present invention. In one embodiment, the contextual information may be exchanged between a sending party and a receiving party. As with FIG. 7, the sending party herein may be any VoIP entity (e.g., a client, a client device, service provider, third party service provider, etc.) which can collect and transmit a set of contextual information which is represented based on corresponding structured hierarchies. Likewise, the receiving party herein may be any VoIP entity which can identify and request for a set of contextual information from the sending party. For purpose of discussion, assume that the receiving party is a service provider. Beginning at block 1302, a set of contextual information of the sending party may be identified which is to be included as part of the conversation. In an illustrative embodiment, a service provider (the receiving party) may identify a set of contextual information to be collected from the sending party. In this embodiment, the service provider may send a request for the identified set of contextual information to the sending party. Upon receipt of the request, the sending party collects the identified set of contextual information. In another embodiment, other clients, or third party provider may identify a set of contextual information of the sending party and request the identified set of contextual information. In an alternative embodiment, the sending party may identify the set of contextual information to be included as part of the conversation and collect the identified set of contextual information without receiving such requests. For example, the sending party may collect prepackaged contextual information and automatically transmit the prepackaged contextual information to the service provider.

As described above, based on the content of the identified set of contextual information, the sending party may further identify at least one structured hierarchy from predefined structured hierarchies, such as an XML namespace and the like. The sending party transmits the collected set of contextual information in accordance with the structured hierarchies.

In one embodiment, the service provider may requests to obtain additional contextual information from the sending party only if there have been changes in the sending party's contextual information which had been previously obtained. In this manner, the amount of contextual information exchanged between the service provider and the sending party can be minimized. Likewise, the sending party may collect and transmit a set of contextual information in response to a change in the previously transmitted contextual information. Alternatively, the sending party may collect and transmit contextual information at predetermined time intervals.

At block 1304, the set of contextual information represented in accordance with corresponding structured hierarchies is obtained. The set of contextual information may be obtained from the sending party. However, the set of contextual information may be obtained from any VoIP entity such as a third party service provider. Further, the set of contextual information can be retrieved from the service provider related to the sending party. At decision block 1306, a determination is made as to whether the obtained contextual information needs to be changed by the service provider. If it is determined at decision block 1306 that some parts of the contextual information need to be changed (updated), the service provider may process the obtained contextual information based on the identified structured hierarchies at block 1308.

In an illustrative embodiment, the service provider may update the obtained contextual information by adding more information, deleting part of the obtained contextual information, and/or modifying the obtained contextual information. The updated contextual information may be stored on local storage of the service provider. If it is determined at decision block 1306 that no part of the contextual information needs to be updated, or alternatively, after processing and updating the obtained contextual information (block 1308), the service provider transmits the contextual information (e.g., the obtained contextual information, or the updated contextual information, etc.). The contextual information may be transmitted in accordance with the corresponding structured hierarchies to at least one next designated destination as illustrated by block 1310. The next designated destination can be any VoIP entity such as a client, a service provider, various third party service providers, and the like. The routine 1300 terminates at block 1312.

It is to be understood that the embodiments explained in conjunction with the routine 1300 are provided merely for example purposes. It is contemplated that the routine 1300 can also be performed by any receiving party which includes, but is not limited to, a VoIP device, a client or a third party service provider. It is also contemplated that the obtained contextual information may not be processed at all but stored for future use on a device, local storage of a service provider, or the like. For example, a particular device of a receiving party may not have functionalities to collect or process some type of contextual information but it may have functionalities to forward the received contextual information. In this example, upon receipt of contextual information, the device may store the received contextual information and information of corresponding structural hierarchies on the device storage. For processing the contextual information, the stored contextual information may be forwarded to a VoIP entity which is capable of processing such contextual information. Likewise, a VoIP client may include several devices equipped with different functionalities, each of which may be utilized to process, update and/or collect different types of contextual information and thus may be capable of aiding other devices which are lacking such functionality.

Moreover, any authorized VoIP entities may collect and transmit additional contextual information in response to changes in the contextual information. Subsequently, the previously obtained contextual information can be updated based on the additional information. As such, it is contemplated that contextual information exchanged between VoIP entities can be dynamically changed and evolved at any time (e.g., before, during, and/or after a conversation).

While illustrative embodiments have been illustrated and described, it will be appreciated that various changes can be made therein without departing from the spirit and scope of the invention.

The invention claimed is:

1. A method for collecting and transmitting contextual information relating to a conversation over a conversation channel between Voice-over-IP (VoIP) clients, comprising:
   initializing the conversation channel between VoIP clients;
   during a connection set-up phase exchanging the contextual information between the VoIP clients, wherein the contextual information comprises available media type of each VoIP client and rules of the VoIP clients;
   before exchanging conversational data packets over the conversation channel, identifying a structural hierarchy for an arrangement of the contextual information that is transmitted between the voice-over-IP clients over the conversation channel; wherein the structural hierarchy is a predefined organizational structure for arranging contextual information to be exchanged between the voice-over-IP clients;

from the structural hierarchy, identifying a set of contextual information for enabling enhanced call features between the voice-over-IP clients of a call and for inclusion as part of the conversation of the call between two voice-over-IP clients and defined according to the structural hierarchy;

obtaining the identified set of contextual information; and transmitting as part of an establishment of the conversation channel of the voice-over IP call the obtained contextual information represented in accordance with the identified structural hierarchy as contextual data packets;

wherein the established conversation channel transmits both conversation data for the voice-over IP call and contextual information.

2. The method of claim 1, wherein the transmitted contextual information is transmitted prior to a beginning of the conversation.

3. The method of claim 1, wherein additional contextual information is transmitted during the conversation.

4. The method of claim 3, wherein the contextual information is transmitted at predetermined time intervals.

5. The method of claim 3, wherein the contextual information is transmitted in response to a change in the contextual information.

6. The method of claim 1, wherein the contextual information includes device related information describing capabilities of a device.

7. The method of claim 1, wherein the contextual information includes user specific information.

8. The method of claim 1, wherein the contextual information includes conversation related information describing the basics of the communication channel.

9. The method of claim 1, wherein the contextual information includes information identifying a subject of the conversation.

10. The method of claim 1, wherein the conversation and the contextual information are transmitted over the Voice-over-Internet Protocol communication channel.

11. The method of claim 10, wherein the hierarchical format is structured as an Extensible Markup Language.

12. The method of claim 1, wherein the contextual information includes a document file and a media document file generated by application software.

13. A memory that stores computer executable components for collecting and transmitting contextual information relating to a conversation over a communication channel between Voice-over-IP (VoIP) clients, comprising:

a conversation channel component for initializing and establishing a conversation channel for a conversation between voice-over-IP clients;

during a connection set-up phase exchanging the contextual information between the VoIP clients, wherein the contextual information comprises available media type of each VoIP client and rules of the VoIP clients;

an information managing component for identifying a predefined structural hierarchy for an arrangement of the contextual information before establishing the conversation channel and before conversation data packets are exchanged over the conversation channel, for identifying, from the structural hierarchy, a set of contextual information for enabling enhanced call features between the voice-over-IP clients of a call and for inclusion in a conversation channel of the call and collecting the identified set of the contextual information; and a contextual information component for defining the structured hierarchy for including the collected contextual information in the conversation channel of the call; wherein the conversation channel transmits both conversation data for the voice-over IP call and the contextual information.

14. The memory of claim 13, wherein the structured hierarchy is a predefined namespace including a call basic class, a call context class, a device type class, and a client class.

15. The memory of claim 14, wherein the call basic class includes a plurality of attributes containing service provider related information, call type related information, and call priority related information.

16. The memory of claim 14, wherein the client class includes a plurality of attributes containing biometric information, location information, and client rule related information.

17. The memory of claim 14, wherein the call contexts class includes a plurality of attributes containing subject information, keywords relating to the conversation, and document files.

18. A system for collecting and transmitting contextual information between at least one receiving party and a sending party wherein the contextual information relates to an exchange of a conversation on a conversation channel, comprising:

during a connection set-up phase exchanging the contextual information between the VoIP clients, wherein the contextual information comprises available media type of each VoIP client and rules of the VoIP clients;

the sending party identifying a predefined structural hierarchy for an arrangement of the contextual information before conversation data packets including conversation are exchanged over the conversation channel, identifying, for the identified structural hierarchy, a set of contextual information for enabling enhanced call features between voice-over-IP clients of an established call and for inclusion in a conversation channel of the call, collecting the identified contextual information, transmitting as part of the conversation of the call using the conversation channel the obtained contextual information represented in accordance with the identified structural hierarchy to the at least one receiving party, and receiving a set of contextual information from the at least one receiving party; and wherein the sending party initiates and establishes the conversation channel.

19. The system of claim 18, wherein the sending party includes at least one VOIP device and a service provider; and wherein the at least one VOIP device is in communication with the service provider.

20. The method of claim 19, wherein the service provider obtains the contextual information provided from the at least one VOIP device.

* * * * *